United States Patent
Suzuki (10) Patent No.: US 12,131,119 B2
(45) Date of Patent: Oct. 29, 2024

(54) INFORMATION GENERATION SYSTEM, WORKFLOW SYSTEM, COMPUTER-READABLE NON-TRANSITORY RECORDING MEDIUM STORING INFORMATION GENERATION PROGRAM, AND COMPUTER-READABLE NON-TRANSITORY RECORDING MEDIUM STORING WORKFLOW PROGRAM

(71) Applicant: KYOCERA Document Solutions Inc., Osaka (JP)

(72) Inventor: Ayaka Suzuki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 330 days.

(21) Appl. No.: 17/668,627

(22) Filed: Feb. 10, 2022

(65) Prior Publication Data
US 2022/0269855 A1 Aug. 25, 2022

(30) Foreign Application Priority Data
Feb. 22, 2021 (JP) ................................ 2021-025933

(51) Int. Cl.
*G06F 40/10* (2020.01)
*G06F 40/103* (2020.01)
*G06F 40/186* (2020.01)
*G06Q 30/04* (2012.01)
*G06V 30/40* (2022.01)
(Continued)

(52) U.S. Cl.
CPC .......... *G06F 40/186* (2020.01); *G06Q 30/04* (2013.01); *G06V 30/413* (2022.01); *G06V 30/42* (2022.01)

(58) Field of Classification Search
USPC ....... 358/1.1–3.29, 1.11–1.18; 382/100–382; 707/705–780
See application file for complete search history.

(56) References Cited

U.S. PATENT DOCUMENTS 7,272,616 B1 * 9/2007 McKinnon ............ G06F 40/186
707/999.102
2007/0279667 A1 12/2007 Hattori et al.
(Continued)

FOREIGN PATENT DOCUMENTS

CN 101083701 12/2007
CN 110619056 12/2019
(Continued)

OTHER PUBLICATIONS

Odate Ryosuke;Computer and Template Management Method;2021 (Year: 2019).*
SIPO, Office Action of CN 202210144563.2 dated Jul. 8, 2024.

*Primary Examiner* — Marcellus J Augustin
(74) *Attorney, Agent, or Firm* — LEX IP MEISTER, PLLC (57) ABSTRACT

In a case where a template associated with a format of an invoice associated with an invoice image is managed in a template database, an information generation system generates information from the invoice image by using the template, and in a case where information is generated from an invoice image by a general-purpose information generation unit, the information generation system generates a template associated with a format of an invoice associated with the invoice image, based on the invoice image, the information, and a template managed in the template database.

5 Claims, 10 Drawing Sheets

(51) Int. Cl.
 *G06V 30/41* (2022.01)
 *G06V 30/413* (2022.01)
 *G06V 30/42* (2022.01)

(56) References Cited

U.S. PATENT DOCUMENTS

| | | | |
|---|---|---|---|
| 2017/0004593 A1* | 1/2017 | Toshimitsu | G16H 10/60 |
| 2017/0147540 A1* | 5/2017 | McCormick | G06F 40/194 |
| 2020/0019767 A1* | 1/2020 | Porter | G06F 18/214 |
| 2021/0064866 A1* | 3/2021 | Rezvani | G06N 20/00 |
| 2021/0240975 A1* | 8/2021 | Sundell | G06V 30/18057 |
| 2022/0172301 A1* | 6/2022 | Guedalia | G06F 40/186 |

FOREIGN PATENT DOCUMENTS

| | | |
|---|---|---|
| CN | 111666885 | 9/2020 |
| CN | 111860450 | 10/2020 |
| JP | 2020-181369 | 11/2020 |

* cited by examiner

INFORMATION GENERATION SYSTEM, WORKFLOW SYSTEM, COMPUTER-READABLE NON-TRANSITORY RECORDING MEDIUM STORING INFORMATION GENERATION PROGRAM, AND COMPUTER-READABLE NON-TRANSITORY RECORDING MEDIUM STORING WORKFLOW PROGRAM

INCORPORATION BY REFERENCE

This application is based upon, and claims the benefit of priority from, corresponding Japanese Patent Application No. 2021-025933 filed in the Japan Patent Office on Feb. 22, 2021, the entire contents of which are incorporated herein by reference.

BACKGROUND

Field of the Invention

The present disclosure relates to an information generation system that generates specific information from an image of a document, a workflow system, a computer-readable non-transitory recording medium storing an information generation program, and a computer-readable non-transitory recording medium storing a workflow program.

Description of Related Art

Typically, there is known a character recognition (character extraction and analysis) technique for a position defined by a template that defines in advance a position on a paper surface where characters are written. In this technique, a form ID of a document converted into image data is identified by printing or writing, on a paper surface, the form ID, which is an identifier of template definition information, and optical character recognition (OCR) processing using an associated template is performed.

SUMMARY

An information generation system according to the present disclosure includes: a document classification unit that classifies a document according to a format of the document; a template type information generation unit that generates, by using a template for generating specific information from an image of the document, the information from the image; a general-purpose information generation unit that generates the information from the image in a general-purpose manner without depending on the format; and a template generation unit that generates the template. When the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit. When the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

A workflow system according to the present disclosure includes: a workflow generation unit that generates a workflow indicating a series of processing by connecting any of blocks among a plurality of the blocks each indicating specific processing; and a workflow execution unit that performs processing indicated in the workflow generated by the workflow generation unit. The workflow generation unit is capable of generating the workflow that achieves a document classification unit that classifies a document according to a format of the document, a template type information generation unit that generates, by using a template for generating specific information from an image of the document, the information from the image, a general-purpose information generation unit that generates the information from the image in a general-purpose manner without depending on the format, and a template generation unit that generates the template. When the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit. When the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

A computer-readable non-transitory recording medium storing an information generation program according to the present disclosure causes a computer to achieve a document classification unit that classifies a document according to a format of the document; a template type information generation unit that generates, by using a template for generating specific information from an image of the document, the information from the image; a general-purpose information generation unit that generates the information from the image in a general-purpose manner without depending on the format; and a template generation unit that generates the template. When the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit. When the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

A computer-readable non-transitory recording medium storing a workflow program according to the present disclosure causes a computer to achieve a workflow generation unit that generates a workflow indicating a series of processing by connecting any of blocks among a plurality of the blocks each indicating specific processing; and a workflow execution unit that performs processing indicated in the workflow generated by the workflow generation unit. The workflow generation unit is capable of generating the workflow that achieves a document classification unit that classifies a document according to a format of the document, a template type information generation unit that generates, by using a template for generating specific information from an image of the document, the information from the image, a general-purpose information generation unit that generates the information from the image in a general-purpose manner without depending on the format, and a template generation unit that generates the template. When the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit. When the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

DETAILED DESCRIPTION

In the following, an embodiment according to the present disclosure is described with reference to the drawings.

First, a configuration of an information processing system according to an embodiment of the present disclosure is described.

Figure 1:
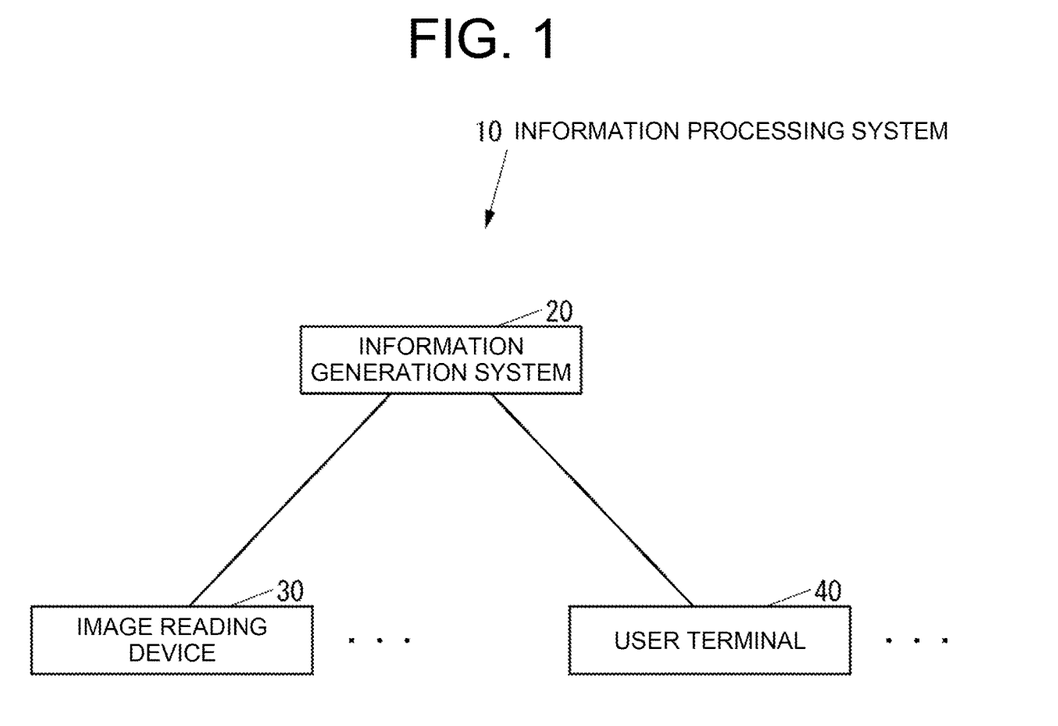
FIG. 1 is a block diagram of an information processing system according to an embodiment of the present disclosure.

FIG. 1 is a block diagram of an information processing system 10 according to the present embodiment.

As illustrated in FIG. 1, the information processing system 10 includes an information generation system 20 that generates specific information (hereinafter, referred to as "specified information") including information extracted from an image of an invoice (hereinafter, referred to as an "invoice image") as a document, an image reading device 30 that reads an invoice image from an actual invoice (hereinafter, referred to as an "actual invoice") constituted of a recording medium such as paper, and a user terminal 40 to be used by a user of the information processing system 10. The information processing system 10 may include at least one image reading device similar to the image reading device 30, in addition to the image reading device 30. The information processing system 10 may include at least one user terminal similar to the user terminal 40, in addition to the user terminal 40.

Specific information is information in which an item name and a value are associated with each other for each item.

The information generation system 20 may be configured of a single computer, or may be configured of a plurality of computers.

The image reading device 30 is configured of, for example, a scanner-dedicated machine, a multifunction peripheral (MFP), or the like.

The user terminal 40 is configured of, for example, a computer such as a personal computer (PC).

The information generation system 20 and the image reading device 30 are communicable via a network such as a local area network (LAN) or the Internet, or directly by wired or wireless connection without a network. Likewise, the information generation system 20 and the user terminal 40 are communicable via a network such as a LAN or the Internet, or directly by wired or wireless connection without a network.

Figure 2:
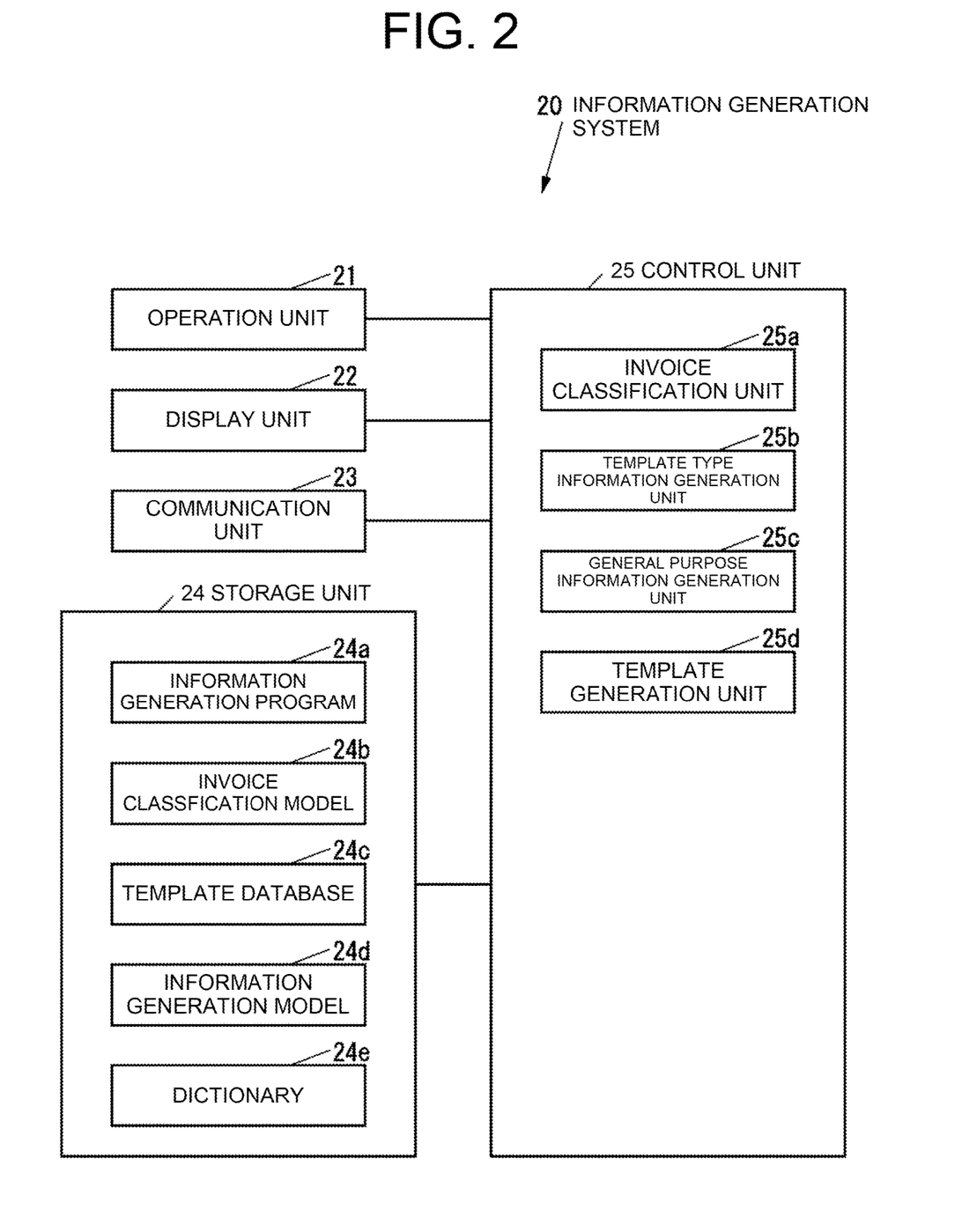
FIG. 2 is a block diagram of the information generation system illustrated in FIG. 1 in a case where the information generation system is configured of a single computer.

FIG. 2 is a block diagram of the information generation system 20 in a case where the information generation system 20 is configured of a single computer.

The information generation system 20 illustrated in FIG. 2 includes an operation unit 21, which is an operation device such as, for example, a keyboard and a mouse through which various operations are input, a display unit 22, which is a display device such as, for example, a liquid crystal display (LCD) that displays various pieces of information, a communication unit 23, which is a communication device that communicates with an external device via a network such as a LAN or the Internet, or directly by wired or wireless connection without a network, a storage unit 24, which is a non-volatile storage device such as, for example, a semiconductor memory or a hard disk drive (HDD) that stores various pieces of information, and a control unit 25 that controls the entirety of the information generation system 20.

The storage unit 24 stores an information generation program 24a for generating specific information. For example, the information generation program 24a may be installed in the information generation system 20 at a manufacturing stage of the information generation system 20, or may be additionally installed in the information generation system 20 from an external storage medium such as a universal serial bus (USB) memory, or may be additionally installed in the information generation system 20 from a network.

The storage unit 24 is capable of storing an invoice classification model 24b as a learning model for classifying invoices according to a format of an invoice (hereinafter, simply referred to as a "format"). The invoice classification model 24b is created by machine learning.

The storage unit 24 is capable of storing a template database 24c that stores templates for generating specific information from an invoice image. The template database 24c manages templates for each format, and constitutes a template management unit according to the present disclosure. A template includes, for each item of information to be extracted from an invoice image, an item name of information to be extracted from an invoice image, an anchor that serves as a reference for a position at which information is extracted from an invoice image, a position (hereinafter, referred to as an "anchor area position") of an area (hereinafter, referred to as an "anchor area") where an anchor is present, and a position (hereinafter, referred to as an "extraction area position") with respect to an anchor in an area (hereinafter, referred to as an "extraction area") where information to be extracted from an invoice image is present. Herein, for example, an anchor may be a specific character string, or may be a specific image such as a logo. For example, a template is defined by an extensible markup language (XML) format.

The storage unit 24 is capable of storing an information generation model 24d as a learning model for generating specific information from an invoice image. The information generation model 24d is created by machine learning. The information generation model 24d is a general-purpose learning model that does not depend on a format, and is capable of extracting, from an invoice image, information, and a position of the information on the invoice image.

The storage unit 24 is capable of storing a dictionary 24e indicating various expressions of an item name of information to be extracted from an invoice image. For example, in the dictionary 24e, "invoice_no" and "invoice_number" are indicated as item names of an item indicating "invoice number," "invoice_date" is indicated as an item name of an item indicating "invoice date," and "total_amount" and "total" are indicated as item names of an item indicating "invoice amount".

For example, the control unit 25 includes a central processing unit (CPU), a read only memory (ROM) storing a program and various pieces of data, and a random access memory (RAM) as a memory to be used as a work area of the CPU of the control unit 25. The CPU of the control unit 25 executes a program stored in the storage unit 24 or the ROM of the control unit 25.

The control unit 25 achieves, by executing the information generation program 24a, an invoice classification unit 25a as a document classification unit that classifies invoices according to a format, a template type information generation unit 25b that generates specific information from an invoice image by using a template, a general-purpose information generation unit 25c that generates specific information from an invoice image in a general-purpose manner without depending on a format, and a template generation unit 25d that generates a template.

Figure 3:
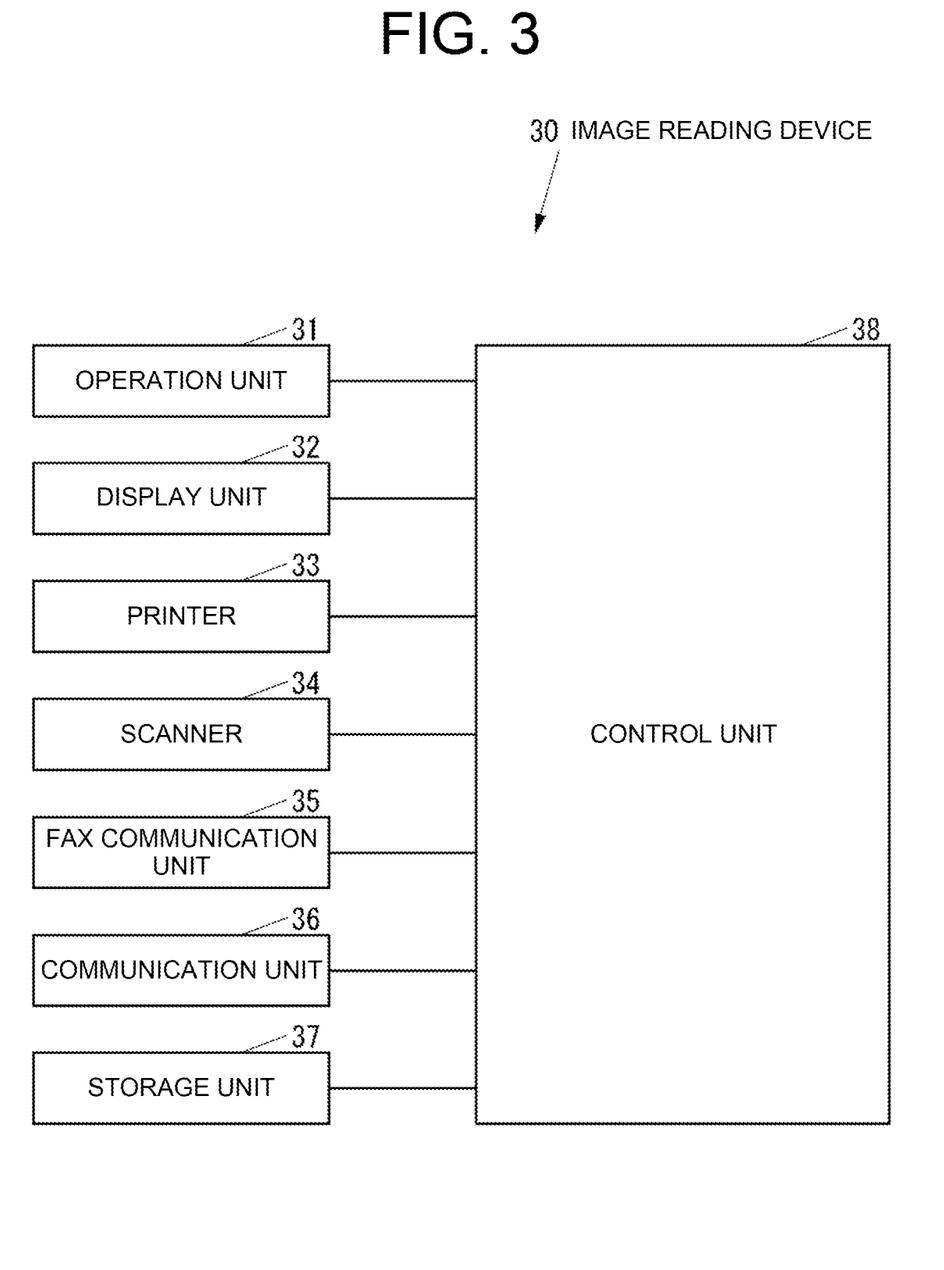
FIG. 3 is a block diagram of an image reading device illustrated in FIG. 1 in a case where the image reading device is an MFP.

FIG. 3 is a block diagram of the image reading device 30 in a case where the image reading device 30 is an MFP.

The image reading device 30 illustrated in FIG. 3 includes an operation unit 31, which is an operation device such as, for example, a button through which various operations are input, a display unit 32, which is a display device such as, for example, an LCD that displays various pieces of information, a printer 33, which is a printing device that prints an image on a recording medium such as paper, a scanner 34, which is a reading device that reads an image from a document, a fax communication unit 35, which is a fax device that performs fax communication with an unillustrated external facsimile device via a communication line such as a public telephone line, a communication unit 36, which is a communication device that communicates with an external device via a network such as a LAN or the Internet, or directly by wired or wireless connection without a network, a storage unit 37, which is a non-volatile storage device such as, for example, a semiconductor memory or a HDD that stores various pieces of information, and a control unit 38 that controls the entirety of the image reading device 30.

For example, the control unit 38 includes a CPU, a ROM storing a program and various pieces of data, and a RAM as a memory to be used as a work area of the CPU of the control unit 38. The CPU of the control unit 38 executes a program stored in the storage unit 37 or the ROM of the control unit 38.

Figure 4:
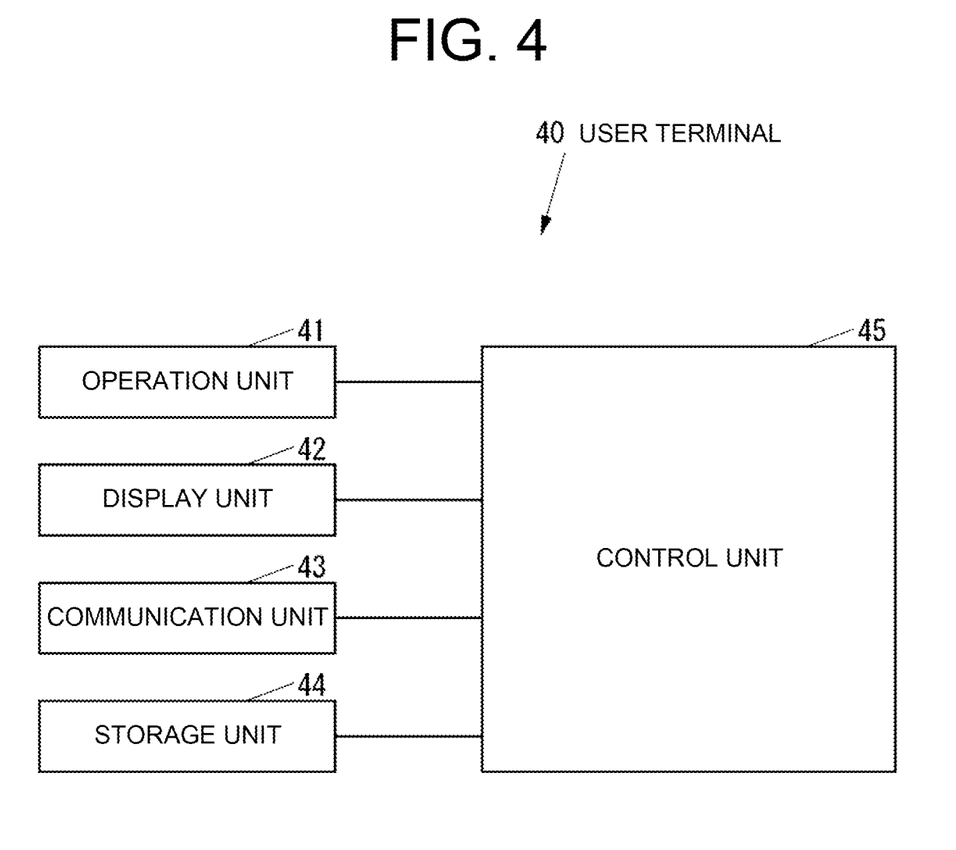
FIG. 4 is a block diagram of a user terminal illustrated in FIG. 1.

FIG. 4 is a block diagram of the user terminal 40.

The user terminal 40 illustrated in FIG. 4 includes an operation unit 41, which is an operation device such as, for example, a keyboard and a mouse through which various operations are input, a display unit 42, which is a display device such as, for example, an LCD that displays various pieces of information, a communication unit 43, which is a communication device that communicates with an external device via a network such as a LAN or the Internet, or directly by wired or wireless connection without a network, a storage unit 44, which is a non-volatile storage device such as, for example, a semiconductor memory or a HDD that stores various pieces of information, and a control unit 45 that controls the entirety of the user terminal 40.

For example, the control unit 45 includes a CPU, a ROM storing a program and various pieces of data, and a RAM as a memory to be used as a work area of the CPU of the control unit 45. The CPU of the control unit 45 executes a program stored in the storage unit 44 or the ROM of the control unit 45.

Next, an operation of the information processing system 10 is described.

First, an operation of the information generation system 20 in a case where specific information is generated from an invoice image is described.

Figure 5:
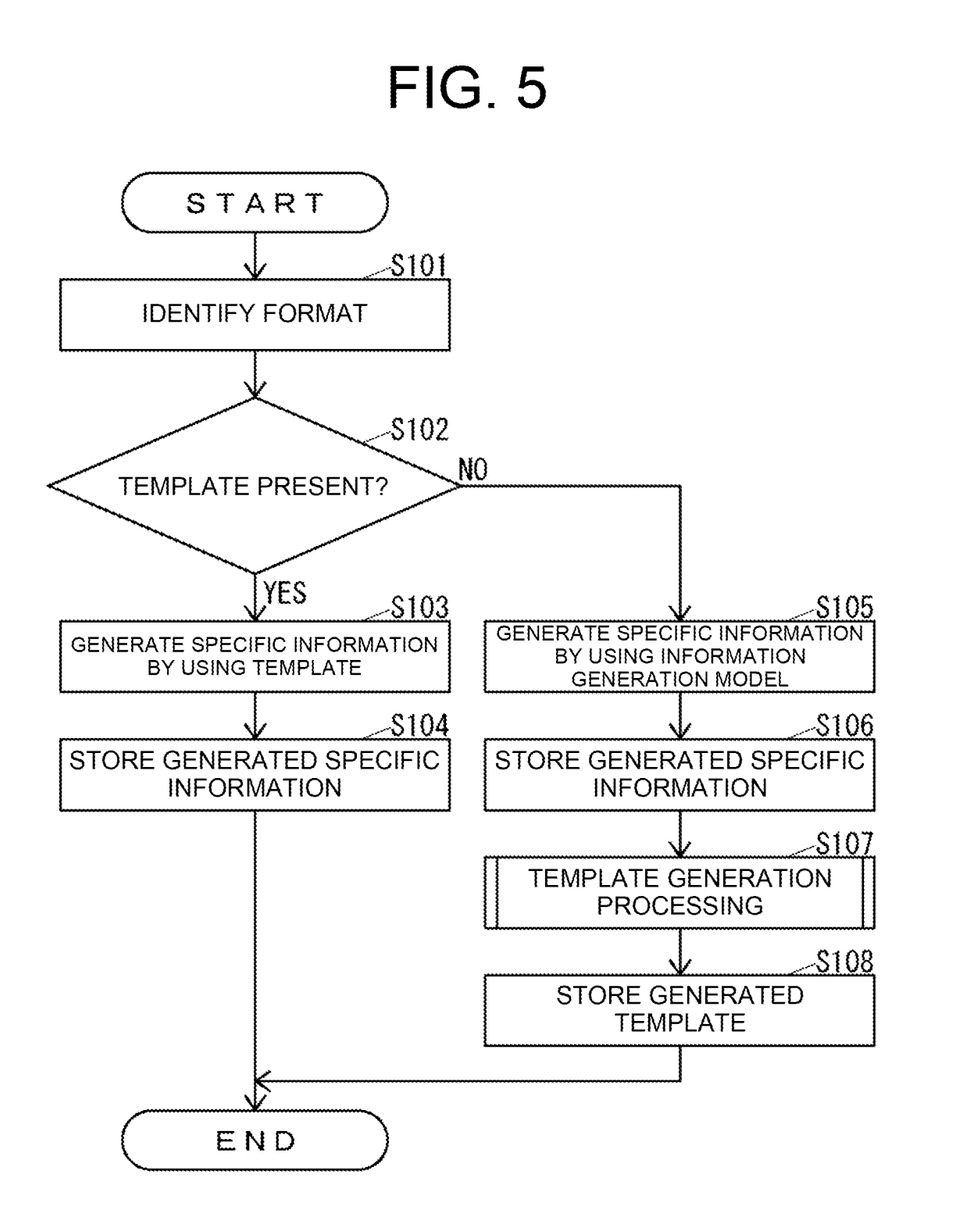
FIG. 5 is a flowchart of an operation of the information generation system illustrated in FIG. 2 in a case where specific information is generated from an invoice image.

FIG. 5 is a flowchart of an operation of the information generation system 20 in a case where specific information is generated from an invoice image.

A user can set an actual invoice on a scanner of an image reading device, and instruct the image reading device to generate specific information from the actual invoice, for example, via an operation unit of the image reading device. When generation of specific information from an actual invoice is instructed, a control unit of the image reading device reads an invoice image from the actual invoice set on the scanner of the image reading device with use of the scanner, and instructs the information generation system 20 to generate specific information from the invoice image via a communication unit of the image reading device. Herein, an instruction (hereinafter, referred to as an "information generation instruction") to generate specific information from an invoice image includes an invoice image as a target of the information generation instruction. When the control unit 25 of the information generation system 20 receives an information generation instruction via the communication unit 23, the control unit 25 performs the operation illustrated in FIG. 5.

As illustrated in FIG. 5, the invoice classification unit 25a identifies a format of an invoice associated with an invoice image as a target of an information generation instruction, based on the invoice image, by using the invoice classification model 24b (S101).

Next, the template type information generation unit 25b determines whether a template associated with the format identified in S101 is present in the template database 24c (S102).

When determining in S102 that a template associated with the format identified in S101 is present in the template database 24c, the template type information generation unit 25b generates specific information from an invoice image as a target of an information generation instruction by using the template associated with the format identified in S101 from among the templates stored in the template database 24c (S103). For example, in a case where "invoice_number", "invoice_date", and "total" are respectively defined as item names of items indicating "invoice number", "invoice date", and "invoice amount" in a template associated with a format identified in S101 from among the templates stored in the template database 24c, in S103, the template type information generation unit 25b extracts a value of each item, and generates specific information by associating the extracted value with an item name defined in the template.

Figure 6:
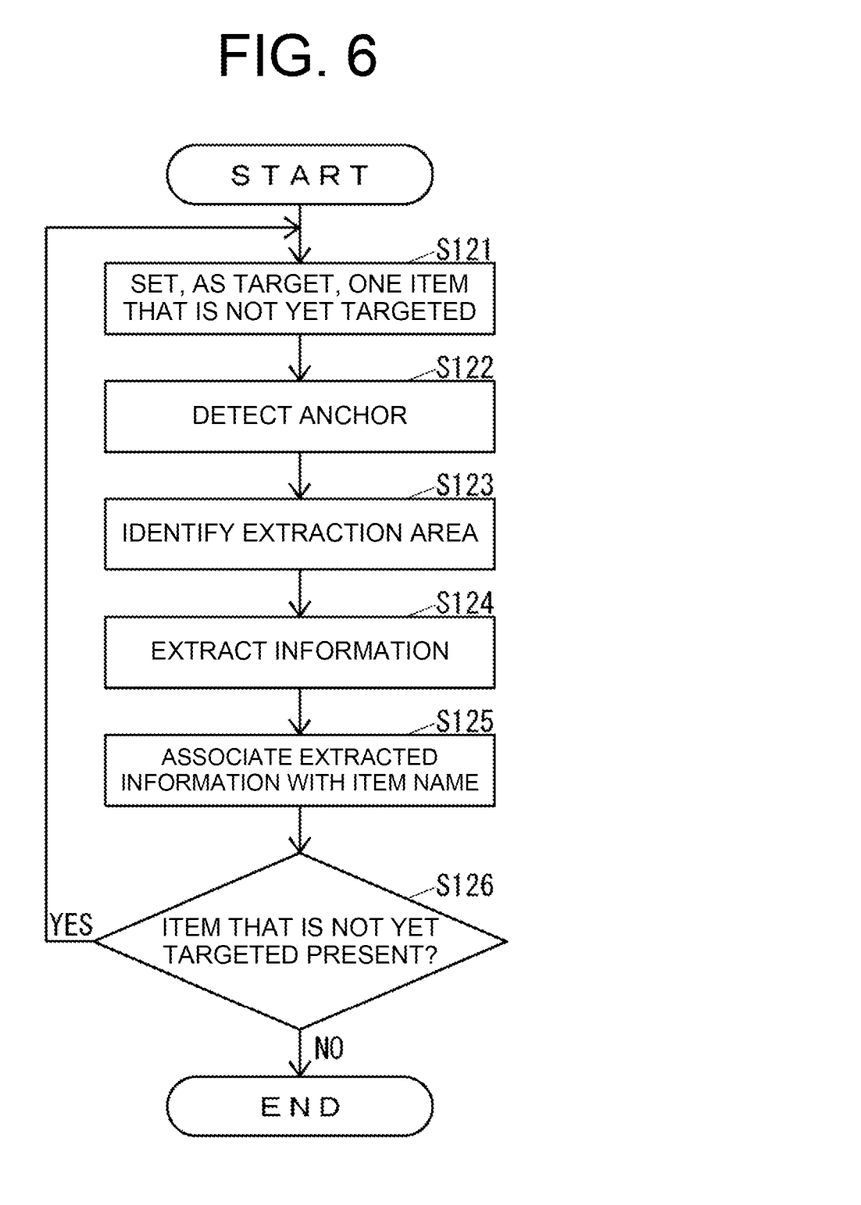
FIG. 6 is a flowchart of an operation of the information generation system illustrated in FIG. 2 in a case where specific information is generated from an invoice image by using a template.

FIG. 6 is a flowchart of an operation of the information generation system 20 in a case where specific information is generated from an invoice image by using a template.

As illustrated in FIG. 6, the template type information generation unit 25b sets, as a target, one item that is not yet targeted in the operation illustrated in FIG. 6 this time from among items included in a target template (S121).

Next, the template type information generation unit 25b detects, in a target invoice image, an anchor included in a target template for a current target item from an anchor area included in the target template for the current target item (S122).

Next, the template type information generation unit 25b identifies, based on the anchor detected in S122, and an extraction area position included in the target template for the current target item, an extraction area for the current target item within the target invoice image (S123).

Next, the template type information generation unit 25b extracts information from the extraction area identified in S123 within the target invoice image (S124).

Next, the template type information generation unit 25b associates the information extracted in S124, and an item name included in the target template for the current target item with each other (S125).

Next, the template type information generation unit 25b determines whether an item that is not yet targeted in the operation illustrated in FIG. 6 this time is present among items included in the target template (S126).

When determining in S126 that an item that is not yet targeted in the operation illustrated in FIG. 6 this time is present among the items included in the target template, the template type information generation unit 25b performs processing of S121.

When determining in S126 that an item that is not yet targeted in the operation illustrated in FIG. 6 this time is not present among the items included in the target template, the template type information generation unit 25b terminates the operation illustrated in FIG. 6.

As illustrated in FIG. 5, after the processing of S103, the template type information generation unit 25b associates specific information generated in S103 with a format identified in S101, and an invoice image as a target of an information generation instruction, and stores the specific information in the storage unit 24 (S104). Thus, the user can confirm specific information stored in the storage unit 24 via a display unit of a user terminal by accessing the information generation system 20 with use of, for example, the user terminal, and can modify the specific information via an operation unit of the user terminal as necessary.

After the processing of S104, the template type information generation unit 25b terminates the operation illustrated in FIG. 5.

When determining in S102 that a template associated with the format identified in S101 is not present in the template database 24c, the general-purpose information generation unit 25c generates specific information from an invoice image as a target of an information generation instruction by using the information generation model 24d (S105). For example, in a case where "invoice_no", "invoice_date", and "total_amount" are respectively defined in the information generation model 24d, as item names of items indicating "invoice number", "invoice date", and "invoice amount", in S105, the general-purpose information generation unit 25c extracts a value of each item, and generates specific information by associating the extracted value with an item name defined in the information generation model 24d.

After the processing of S105, the general-purpose information generation unit 25c associates the specific information generated in S105 with the format identified in S101, and the invoice image as a target of an information generation instruction, and stores the specific information in the storage unit 24 (S106). Thus, the user can confirm specific information stored in the storage unit 24 via a display unit of a user terminal by accessing the information generation system 20 with use of, for example, the user terminal, and can modify the specific information via an operation unit of the user terminal as necessary.

After the processing of S106, the template generation unit 25d performs template generation processing of generating a template, based on the specific information generated in S105 (S107).

Figure 7:
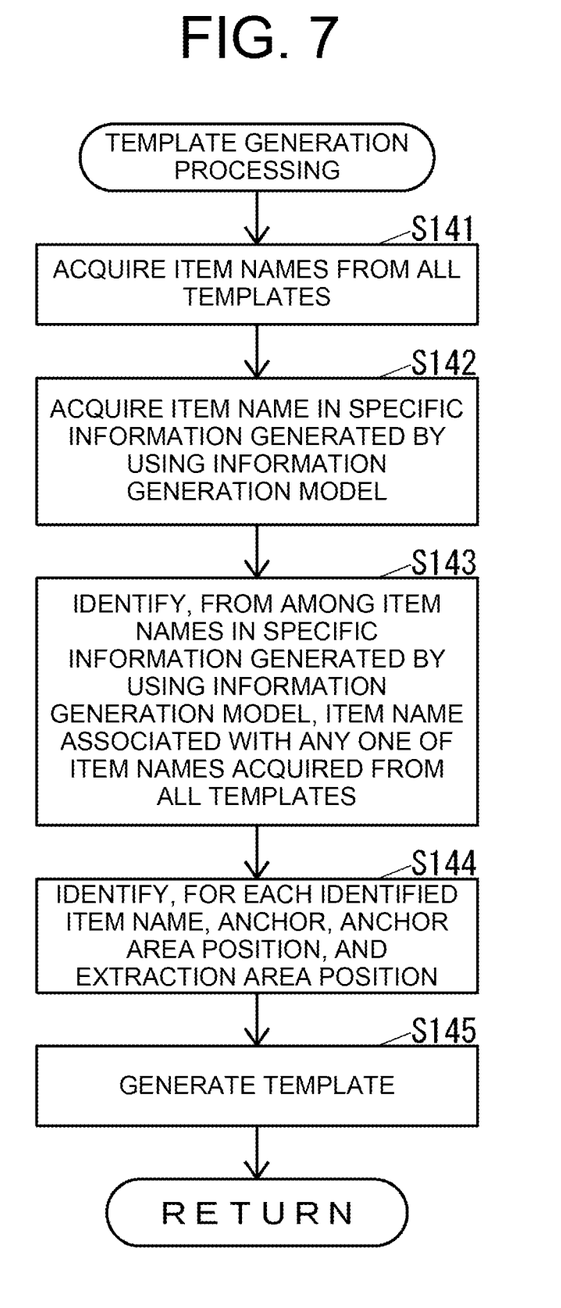
FIG. 7 is a flowchart of template generation processing illustrated in FIG. 5.

FIG. 7 is a flowchart of the template generation processing illustrated in FIG. 5.

As illustrated in FIG. 7, the template generation unit 25d acquires item names from all the templates stored in the template database 24c (S141). For example, in a case where "invoice_number", "invoice_date", and "total" are respectively defined as item names of items indicating "invoice_number", "invoice_date", and "invoice_amount" in a template stored in the template database 24c, the template generation unit 25d acquires "invoice_number", "invoice_date", and "total" in S141.

After the processing of S141, the template generation unit 25d acquires an item name in the specific information generated by using the information generation model 24d in S105 (S142). For example, in S142, the template generation unit 25d acquires "invoice_no", "invoice_date", and "total_amount".

After the processing of S142, the template generation unit 25d identifies, based on the dictionary 24e, an item name acquired in S142, specifically, an item name acquired in S141 from among the item names in the specific information generated by using the information generation model 24d, specifically, an item name associated with any one of the item names acquired from all the templates (S143). For example, the template generation unit 25d identifies that the item names acquired in S142, namely "invoice_no", "invoice_date", and "total_amount" are respectively associated with the item names acquired in S141, namely, "invoice_number", "invoice_date" and "total".

After the processing of S143, the template generation unit 25d identifies, for each item name identified in S143, an anchor, an anchor area position, and an extraction area position from an invoice image as a target of an information generation instruction (S144). Herein, in a case where any one of the character strings indicated in the dictionary 24e for a target item name is present in an invoice image as a target of an information generation instruction, the template generation unit 25d may identify the character string, as an anchor. In a case where any one of the character strings indicated in the dictionary 24e for a target item name is not present in an invoice image as a target of an information generation instruction, the template generation unit 25d may use, as an anchor, some piece of information such as, for example, a logo, which is present in the invoice image. Also, the template generation unit 25d sets, as an extraction area, a specific area including an area from which a value of each item is extracted with respect to an invoice image as a target of an information generation instruction in S105.

After the processing of S144, the template generation unit 25d generates a template by including, for each item, an item name acquired by converting the item name identified in S143 into the item name acquired in S141, and the anchor, the anchor area position, and the extraction area position identified in S144 (S145), and terminates the template generation processing illustrated in FIG. 7.

As illustrated in FIG. 5, after the template generation processing of S107, the template generation unit 25d stores, in the template database 24c, the template generated in S107, as a template for the format identified in S101 (S108). Thus, a user can confirm a template stored in the template database 24c via a display unit of a user terminal by accessing the information generation system 20 with use of, for example, the user terminal, and can modify the template via an operation unit of the user terminal as necessary. Note that, the template stored in the template database 24c in S108 is in a state of temporary registration. In a case where the user confirms the template via a display unit of the user terminal, it is possible to change a state of the template into a state of full registration via an operation unit of the user terminal. In a case where a template in a state of temporary registration is stored in the template database 24c, the template generation unit 25d can notify a specific contact destination of an instruction to change the state of the template into a state of full registration.

After the processing of S108, the template generation unit 25d terminates the operation illustrated in FIG. 5.

Next, an operation of the information generation system 20 in a case where a template is generated from an invoice image is described.

Figure 8:
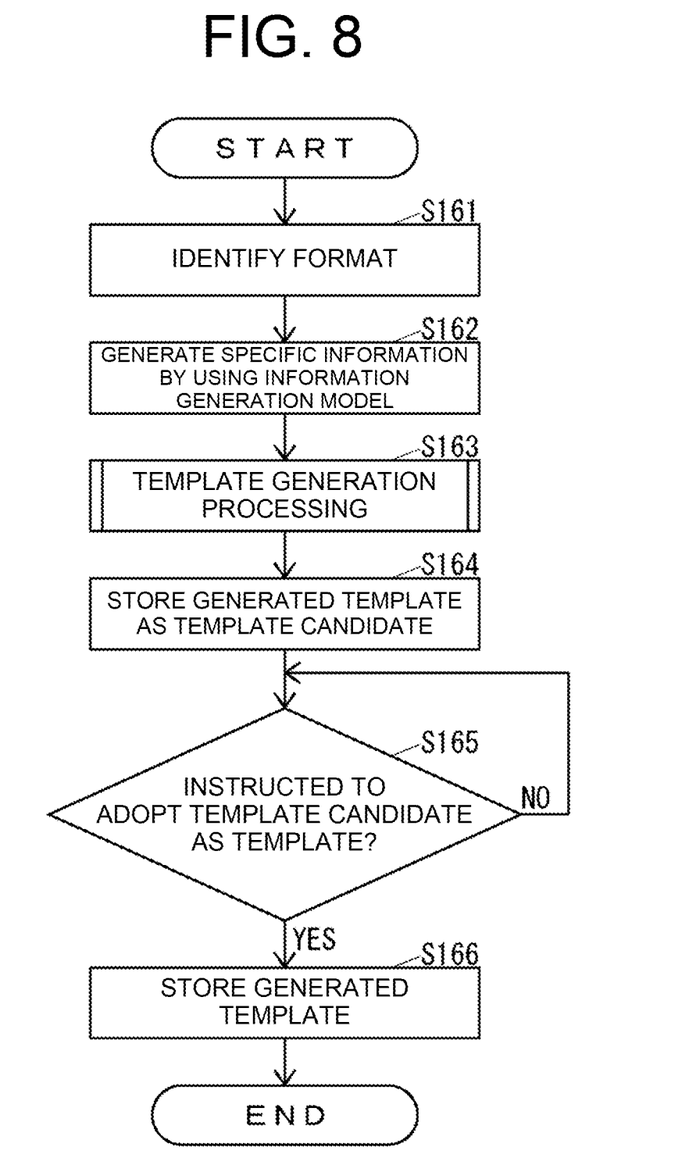
FIG. 8 is a flowchart of an operation of the information generation system illustrated in FIG. 2 in a case where a template is generated from an invoice image.

FIG. 8 is a flowchart of an operation of the information generation system 20 in a case where a template is generated from an invoice image.

A user can set an actual invoice on a scanner of an image reading device, and instruct the image reading device to generate a template from the actual invoice, for example, via an operation unit of the image reading device. When generation of a template from the actual invoice is instructed, a control unit of the image reading device reads an invoice image from the actual invoice set on the scanner of the image reading device with use of the scanner, and instructs the information generation system 20 to generate a template from the invoice image via a communication unit of the image reading device. Herein, an instruction (hereinafter, referred to as a "template generation instruction") to generate a template from an invoice image includes an invoice image as a target of a template generation instruction. When receiving a template generation instruction via the communication unit 23, the control unit 25 of the information generation system 20 performs the operation illustrated in FIG. 8.

As illustrated in FIG. 8, the invoice classification unit 25a identifies a format of an invoice associated with an invoice image as a target of a template generation instruction, based on the invoice image, by using the invoice classification model 24b (S161).

Next, the general-purpose information generation unit 25c generates specific information from the invoice image as a target of a template generation instruction by using the information generation model 24d in a similar manner to that in the processing of S105 (S162).

Next, the template generation unit 25d performs template generation processing of generating a template, based on the specific information generated in S162 in a similar manner to that in the processing of S107 (S163).

Next, the template generation unit 25d stores, in the storage unit 24, the template generated in S163, as a candidate of a template (hereinafter, referred to as a "template candidate") for the format identified in S161 (S164). Thus, the user can confirm a template candidate stored in the storage unit 24 via a display unit of a user terminal by accessing the information generation system 20 with use of, for example, the user terminal, and can modify the template candidate via an operation unit of the user terminal as necessary. In a case where the user confirms the template candidate via a display unit of the user terminal, the user can instruct the information generation system 20 to adopt the template candidate as a template, for example, via an operation unit of the user terminal.

After the processing of S164, the template generation unit 25d determines whether it is instructed to adopt the template candidate stored in S164, as a template until it is determined that it is instructed to adopt the template candidate stored in S164 as a template (S165).

When it is determined in S165 that it is instructed to adopt the template candidate stored in S164 as a template, the template generation unit 25d stores, in the template database 24c, the template candidate stored in S164, as a template for the format identified in S161 (S166), and terminates the operation illustrated in FIG. 8.

As described above, the information generation system 20 generates, based on an invoice image, specific information generated from the invoice image by the general-purpose information generation unit 25c, and a template managed in the template database 24c, a template associated with a format of an invoice associated with the invoice image (S107 and S163). Therefore, it is possible to eliminate the necessity of creating a template associated with a format of the invoice only by manpower. Specifically, the information generation system 20 can facilitate creation of a template for generating specific information from an invoice image.

The information generation system 20 can generate specific information from an invoice image by the general-purpose information generation unit 25c, even in a case where a template associated with a format of an invoice associated with the invoice image as a target of an information generation instruction is not present in the template database 24c (NO in S102) (S105). Therefore, it is possible to eliminate the necessity of generating specific information from the invoice image only by manpower. Consequently, it is possible to shorten a time required for generating specific information from an invoice image.

The information generation system 20 may be achieved by a workflow system 50 (see FIG. 9) that performs processing indicated in a workflow indicating a series of processing. The workflow system 50 may be configured of a single computer as illustrated in FIG. 9, or may be configured of a plurality of computers.

Figure 9:
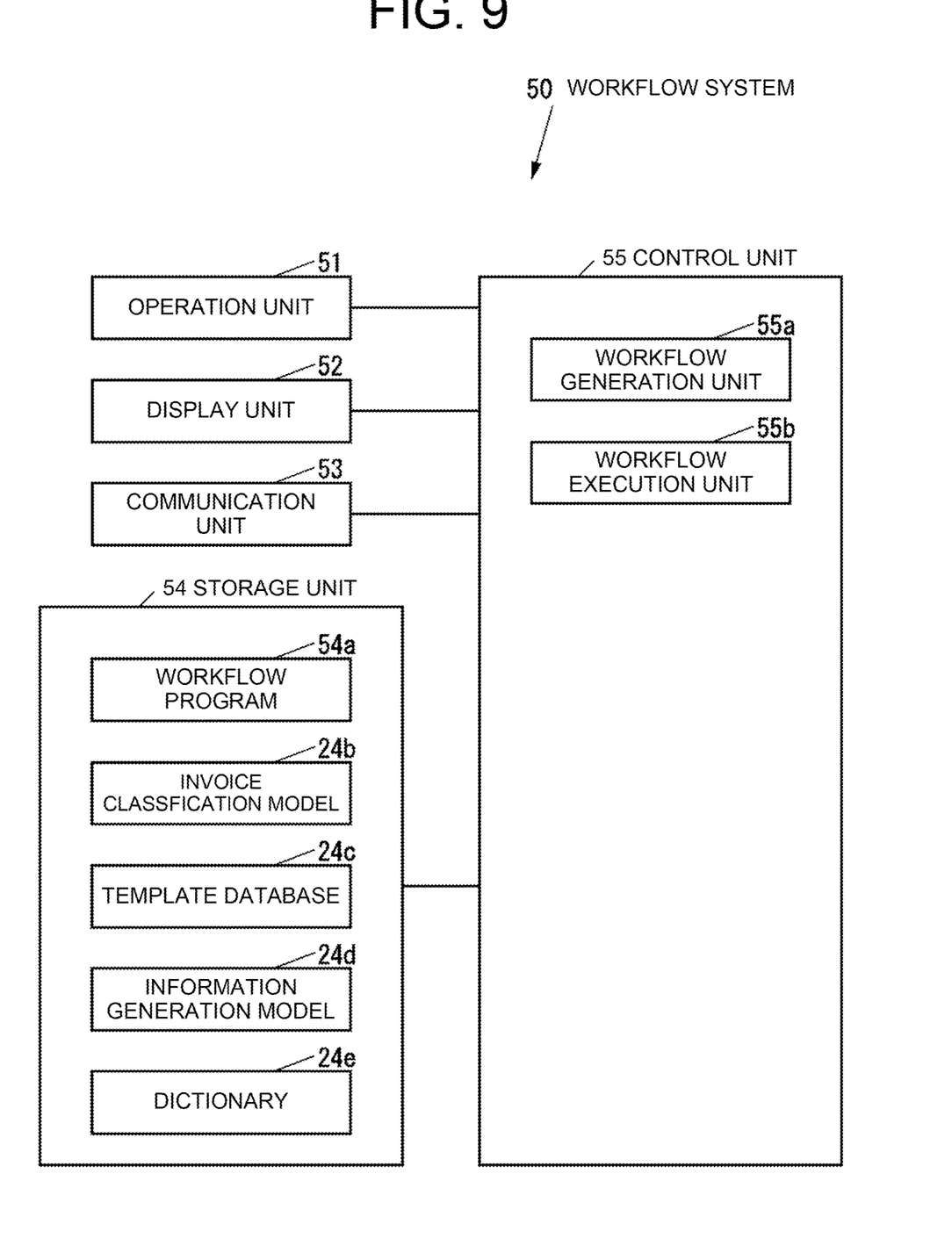
FIG. 9 is a block diagram of a workflow system that achieves the information generation system illustrated in FIG. 2.

FIG. 9 is a block diagram of the workflow system 50 that achieves the information generation system 20.

The workflow system 50 illustrated in FIG. 9 includes an operation unit 51, which is an operation device such as, for example, a keyboard and a mouse through which various operations are input, a display unit 52, which is a display device such as, for example, an LCD that displays various pieces of information, a communication unit 53, which is a communication device that communicates with an external device via a network such as a LAN or the Internet, or directly by wired or wireless connection without a network, a storage unit 54, which is a non-volatile storage device such as, for example, a semiconductor memory or a HDD that stores various pieces of information, and a control unit 55 that controls the entirety of the workflow system 50.

The storage unit 54 stores a workflow program 54a for executing processing indicated in a workflow. For example, the workflow program 54a may be installed in the workflow system 50 at a manufacturing stage of the workflow system 50, or may be additionally installed in the workflow system 50 from an external storage medium such as a USB memory, or may be additionally installed in the workflow system 50 from a network.

The storage unit 54 is capable of storing the invoice classification model 24b, the template database 24c the information generation model 24d, and the dictionary 24e.

For example, the control unit 55 includes a CPU, a ROM storing a program and various pieces of data, and a RAM to be used as a work area of the CPU of the control unit 55. The CPU of the control unit 55 executes a program stored in the storage unit 54 or the ROM of the control unit 55.

By executing the workflow program 54a, the control unit 55 achieves, from among a plurality of blocks each indicating specific processing, a workflow generation unit 55a that generates a workflow by connecting any of the blocks, and a workflow execution unit 55b that performs processing indicated in the workflow generated by the workflow generation unit 55a.

In the workflow system 50, it is possible to instruct generation of a workflow by a user, for example, via an operation unit of a user terminal. For example, the workflow generation unit 55a is capable of displaying, on a display unit of a user terminal, a workflow generation screen for generating a workflow, and generating a workflow that achieves the invoice classification unit 25a, the template type information generation unit 25b, the general-purpose information generation unit 25c, and the template generation unit 25d in response to an instruction from the user via an operation unit of the user terminal with respect to the workflow generation screen. Specifically, the workflow generation unit 55a is capable of generating a workflow that achieves the operation illustrated in FIG. 5, and a workflow that achieves the operation illustrated in FIG. 8.

Figure 10:
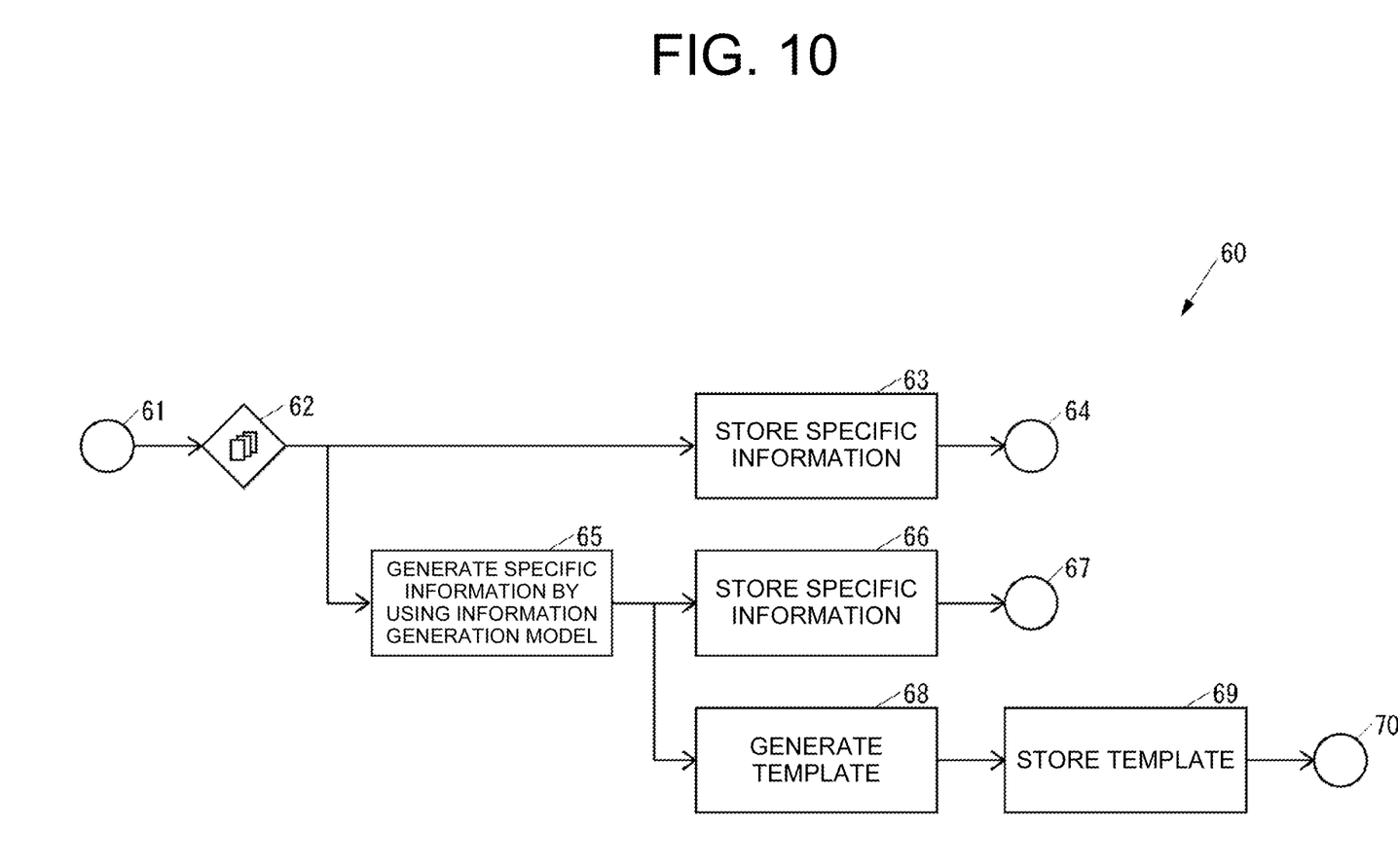
FIG. 10 is a diagram illustrating an example of a workflow indicated in a workflow generation screen to be displayed on a display unit of the user terminal illustrated in FIG. 1.

FIG. 10 is a diagram illustrating an example of a workflow indicated in a workflow generation screen to be displayed on a display unit of a user terminal.

A workflow 60 illustrated in FIG. 10 is an example of a workflow that achieves the operation illustrated in FIG. 5. The workflow 60 is generated by connecting a block 61 indicating input of an invoice image from an image reading device, a block 62 indicating processing from S101 to S103, a block 63 indicating processing of S104, a block 64 indicating the storage unit 24, a block 65 indicating processing of S105, a block 66 indicating processing of S106, a block 67 indicating the storage unit 24, a block 68 indicating processing of S107, a block 69 indicating processing of S108, and a block 70 indicating the template database 24c.

In the workflow system 50 illustrated in FIG. 9, it is possible to confirm a workflow generated by the workflow generation unit 55a by a user via a display unit of an image reading device, and it is possible to instruct execution of the workflow generated by the workflow generation unit 55a by the user via an operation unit of the image reading device.

The user can set an actual invoice on a scanner of an image reading device, and instruct the image reading device to execute a workflow that achieves the operation illustrated in FIG. 5, for example, via an operation unit of the image reading device. When execution of the workflow is instructed, a control unit of the image reading device reads an invoice image from the actual invoice set on the scanner of the image reading device with use of the scanner, and transmits, to the workflow system 50 via a communication unit of the image reading device, an instruction to execute the workflow together with the read invoice image. When receiving the instruction to execute the workflow via the communication unit 23, the workflow execution unit 55b of the workflow system 50 achieves the operation illustrated in FIG. 5.

Likewise, the user can set an actual invoice on a scanner of an image reading device, and instruct the image reading device to execute a workflow that achieves the operation illustrated in FIG. 8, for example, via an operation unit of the image reading device. When execution of the workflow is instructed, a control unit of the image reading device reads an invoice image from the actual invoice set on the scanner of the image reading device with use of the scanner, and transmits, to the workflow system 50 via a communication unit of the image reading device, an instruction to execute the workflow together with the read invoice image. When receiving the instruction to execute the workflow via the communication unit 23, the workflow execution unit 55b of the workflow system 50 achieves the operation illustrated in FIG. 8.

In the foregoing description, the general-purpose information generation unit 25c generates specific information from an invoice image by using the information generation model 24d (S105 and S162). Alternatively, the general-purpose information generation unit 25c may generate specific information from an invoice image without using the information generation model 24d. For example, the general-purpose information generation unit 25c may generate specific information from an invoice image by using an external service of the information generation system 20, such as a cloud service that generates specific information from an invoice image in a general-purpose manner without depending on a format. In the information generation system 20, when the general-purpose information generation unit 25c generates specific information from an invoice image by using an external service of the information generation system 20, the information generation model 24d does not have to be generated in advance by a provider or a user of the information generation system 20. Therefore, burden on the provider or the user of the information generation system 20 can be reduced. Also, in the information generation system 20, the template generation unit 25*d* generates a template, based on specific information generated from an invoice image by the general-purpose information generation unit 25*c*. Therefore, even when it is necessary to pay a usage fee to a provider of an external service according to usage of the external service in a case where the general-purpose information generation unit 25*c* generates specific information from an invoice image by using the external service of the information generation system 20, it is possible to reduce the number of times of generating specific information from an invoice image by the general-purpose information generation unit 25*c* with use of the external service of the information generation system 20. Consequently, it is possible to reduce the usage fee to be paid to the provider of the external service.

In the foregoing description, the template generation unit 25*d* identifies, based on the dictionary 24*e*, an item name associated with any one of item names acquired from all the templates stored in the template database 24*c* from among item names in specific information generated by the general-purpose information generation unit 25*c* (S143). Alternatively, the template generation unit 25*d* may identify, without using the dictionary 24*e*, an item name associated with any one of item names acquired from all the templates stored in the template database 24*c* from among item names in specific information generated by the general-purpose information generation unit 25*c*. For example, the template generation unit 25*d* may identify an item name associated with any one of item names acquired from all the templates stored in the template database 24*c* from among item names in specific information generated by the general-purpose information generation unit 25*c* by using a learning model created by machine learning.

In the foregoing, an invoice has been described as an example of a document. However, the present disclosure is also applicable to a document other than an invoice. For example, the present disclosure is also applicable to various forms, such as quotations, receipts, and delivery slips.

What is claimed is:

1. An information generation system comprising:
    a communication unit that receives an image which is electronic data of a document through a communication line;
    a document classification unit that classifies the document according to a format of the document on the basis of the image;
    a template type information generation unit that generates, by using a template for generating specific information from the image of the document, the information from the image;
    a general-purpose information generation unit that generates the information from the image in a general-purpose manner without depending on the format; and
    a template generation unit that generates the template, wherein
    when the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit, and
    when the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

2. The information generation system according to claim 1, wherein
    the general-purpose information generation unit generates the information from the image by using an external service of the information generation system that generates the information from the image in a general-purpose manner without depending on the format.

3. A workflow system comprising:
    a workflow generation unit that generates a workflow indicating a series of processing by connecting any of blocks among a plurality of the blocks each indicating specific processing; and
    a workflow execution unit that performs processing indicated in the workflow generated by the workflow generation unit, wherein
    the workflow generation unit is capable of generating the workflow that achieves the series of the blocks of
        a communication unit that receives an image which is electronic data of a document through a communication line,
        a document classification unit that classifies the document according to a format of the document on the basis of the image,
        a template type information generation unit that generates, by using a template for generating specific information from the image of the document, the information from the image,
        a general-purpose information generation unit that generates the information from the image in a general-purpose manner without depending on the format, and
        a template generation unit that generates the template,
    when the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit, and
    when the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

4. A computer-readable non-transitory recording medium storing an information generation program that causes a computer to achieve
    a document classification unit that classifies a document according to a format of the document;

a template type information generation unit that generates, by using a template for generating specific information from an image of the document, the information from the image;
a general-purpose information generation unit that generates the information from the image in a general-purpose manner without depending on the format; and
a template generation unit that generates the template, wherein
when the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit, and
when the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

5. A computer-readable non-transitory recording medium storing a workflow program that causes a computer to achieve
a workflow generation unit that generates a workflow indicating a series of processing by connecting any of blocks among a plurality of the blocks each indicating specific processing; and
a workflow execution unit that performs processing indicated in the workflow generated by the workflow generation unit, wherein
the workflow generation unit is capable of generating the workflow that achieves
a document classification unit that classifies a document according to a format of the document,
a template type information generation unit that generates, by using a template for generating specific information from an image of the document, the information from the image,
a general-purpose information generation unit that generates the information from the image in a general-purpose manner without depending on the format, and
a template generation unit that generates the template,
when the template associated with the format identified by the document classification unit is managed by a template management unit that manages the template in a case where the format of the document associated with the image is identified by the document classification unit, the template type information generation unit generates the information from the image by using the template associated with the format identified by the document classification unit from among the template managed by the template management unit, and
when the information is generated from the image by the general-purpose information generation unit in a case where the format of the document associated with the image is identified by the document classification unit, the template generation unit generates the template associated with the format identified by the document classification unit, based on the image, the information, and the template managed by the template management unit.

\* \* \* \* \*